United States Patent [19]
Lehman

[11] 3,900,300
[45] Aug. 19, 1975

[54] VAPOR-LIQUID SEPARATION APPARATUS
[75] Inventor: Bruce Lehman, South Holland, Ill.
[73] Assignee: Universal Oil Products Company, Des Plaines, Ill.
[22] Filed: Oct. 19, 1974
[21] Appl. No.: 408,139

[52] U.S. Cl. .................................. 55/184; 55/204
[51] Int. Cl. ............................................. B01d 19/00
[58] Field of Search ....... 55/90, 183, 184, 185, 204; 261/114 R

[56] References Cited
UNITED STATES PATENTS

| | | | |
|---|---|---|---|
| 1,822,322 | 9/1931 | Stover et al. | 261/114 R |
| 1,994,110 | 3/1935 | Pittman | 55/184 |
| 2,817,411 | 12/1957 | Coberly | 261/114 R |
| 2,973,189 | 2/1961 | Chu | 261/114 R |
| R17,983 | 2/1931 | Walker | 55/184 X |

Primary Examiner—Charles N. Hart
Assistant Examiner—Richard W. Burks
Attorney, Agent, or Firm—James R. Hoatson, Jr.; Robert W. Erickson; William H. Page, II

[57] ABSTRACT

A mixed-phase fluid stream is divided into a vapor stream and a liquid stream by discharging the mixed-phase stream tangentially into an outer annular volume in which the liquid falls to a lower portion of the apparatus for removal. Released vapors pass through perforations in the inner wall of the annulus and then rise through liquid-vapor contacting means before leaving through the top of the apparatus. The vapors passing through the liquid-vapor contacting means preferably contact a hydrocarbon liquid lighter than that entrained in the vapor stream, and this second liquid stream then captures entrained heavy hydrocarbon material and prevents its carry over to downstream operations.

4 Claims, 4 Drawing Figures

PATENTED AUG 19 1975

3,900,300

VAPOR-LIQUID SEPARATION APPARATUS

BACKGROUND OF THE INVENTION

1. Field of the Invention

My invention pertains to the separation of mixed-phase fluid streams of vapor and liquid into separate streams of liquid and vapor. My invention specifically relates to an apparatus used in a hydrocarbon conversion process for removing entrained liquid from a gas stream and for degassifying the liquid stream thereby produced.

2. Description Of The Prior Art

Many designs for vapor-liquid separators are present in the prior art. Representative examples showing some of the more common characteristics are U.S. Pat. Nos. 1,838,507; 1,994,110; 2,788,080 (Cl. 55-183); and 3,213,595 (Cl. 55-204).

A process utilizing an independent liquid stream fed to a vapor contacting zone to remove entrained liquid is presented in U.S. Pat. No. 3,546,099. My invention is an apparatus fulfilling the objective of the improved performance of this and other similar processes, and accordingly adds features not disclosed in the latter reference.

SUMMARY OF THE INVENTION

My invention provides an apparatus which separates a mixed-phase stream by first discharging the mixed-phase stream tangentially into an annular volume. Much of the liquid spreads over the outer surface of the annulus thereby increasing the liquid-vapor contact area, and the total liquid flow then descends to a lower annulus having a large baffled holding volume which facilitates the release of gas bubbles entrained in the liquid by maintaining the liquid in a stagnant condition. Vapors released in the outer annular volume must pass through perforations in the inner wall of the annulus and then upward at a relatively low velocity which aids the separation of entrained liquid droplets. The vapors are then contacted with an independently produced liquid which captures residual entrained liquid before the vapors are removed from the apparatus.

My invention may be summarized as a vaporliquid separation apparatus which comprises: (a) a vertically orientated cylindrical outer vessel; (b) an upper cylindrical wall, axially aligned within the vessel and forming an upper annular volume located between the inner surface of the outer vessel and the outer surface of the upper cylindrical wall, and also forming an upper cylindrical volume located within the upper cylindrical wall, said annular volume having an upper seal which prevents fluid flow and communicating with a hereinafter described lower annular volume, said upper cylindrical wall having a plurality of perforations located a vertical distance below a hereinafter described mixed-phase fluid inlet means, which perforations allow the passage of fluids from the upper annular volume into the upper cylindrical volume; (c) a mixed-phase fluid inlet means passing into the vessel and discharging an entering fluid mixture into the upper annular volume in a substantially tangential direction relative to the inner surface of the outer vessel; (d) a lower cylindrical wall axially aligned within the vessel and forming a lower annular volume between the inner surface of the outer vessel and the outer surface of the lower cylindrical wall and also forming a lower cylindrical volume located within the lower cylindrical wall, the lower cylindrical wall having a smaller diameter than the upper cylindrical wall and being located below the upper cylindrical wall, with the interface between the bottom of the upper cylindrical wall and the top of the lower cylindrical wall being sealed to prevent fluid flow, and with a lower portion of the lower annular volume in communication with a bottom portion of the internal volume of the outer vessel; (e) a liquid outlet means passing through a wall of the vessel and communicating with said bottom portion of the internal volume of the vessel to effect the withdrawal of separated liquid material which entered the upper annular volume via the mixed-phase fluid inlet means and descended through said upper annular volume into the lower annular volume and then into the lower portion of the vessel; (f) a liquid-vapor contacting means located in said upper cylindrical volume at a point above said perforations in the upper cylindrical wall, said liquid-vapor contacting means extending across the upper cylindrical volume to effect the passage of vapor entering the cylindrical volume from the upper annular volume through the liquid-vapor contacting means; (g) a liquid inlet conduit means passing through a wall of the vessel and extending to an upper portion of said liquid-vapor contacting means; (h) a vapor outlet means passing through a wall of the vessel and communicating with an upper portion of the internal volume of the vessel which is above said liquid-vapor contacting means to effect the withdrawal of a vapor from the vessel, said vapor having passed into the vessel and into the upper annular volume via said mixed-phase fluid inlet means and then into the upper cylindrical volume through the perforations in said upper cylindrical wall before having passed upward through the liquid-vapor contacting means, whereby a mixed-phase stream is divided into a liquid fraction which descends through the annular volumes and a vapor fraction which separates from the liquid and passes through the perforations in the cylindrical wall before traveling upward through a liquid-vapor contacting means wherein liquid material entrained in the vapor is removed by contacting the rising vapor with externally produced liquid material.

Figure 1:
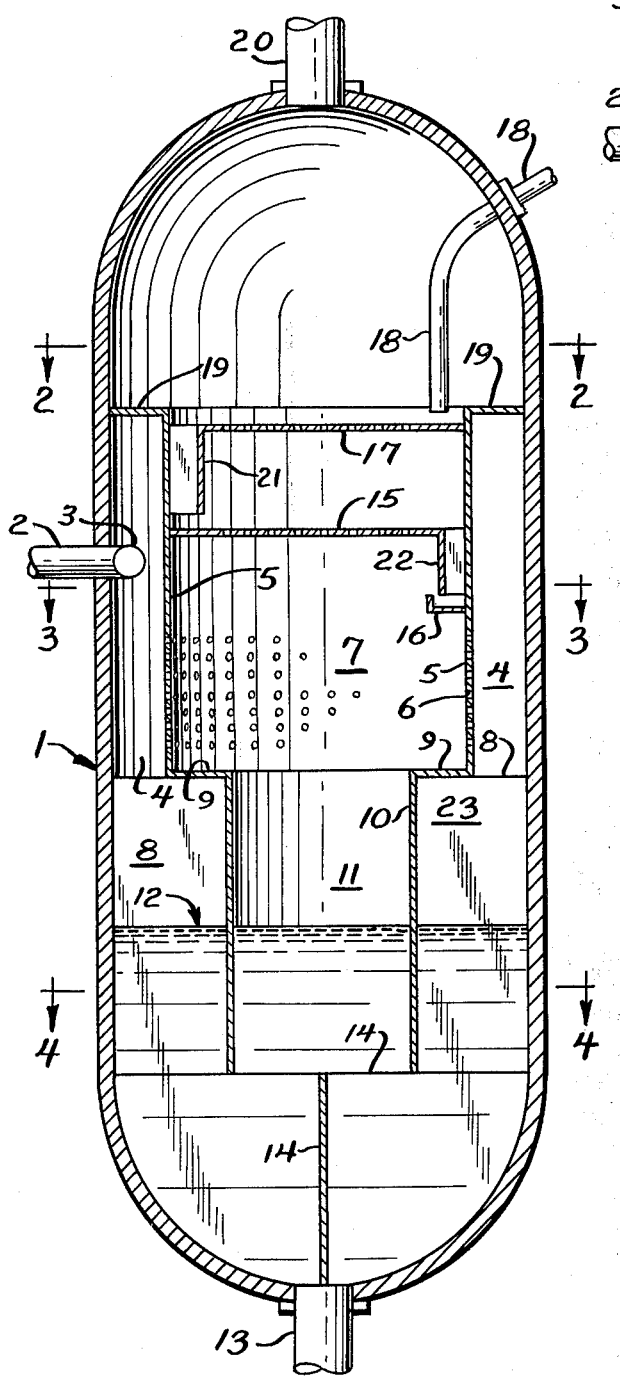
FIG. 1 is a vertical cross-section of the preferred embodiment of my invention.

Shown in FIG. 1 is a vertically orientated cylindrical outer vessel 1 which is used as a hot high-pressure separator in a black oil conversion process. A mixed-phase stream of reactor effluent fluid passes through Line 2 into the outer vessel 1 and is directed in a substantially tangential direction relative to the inner surface of the outer vessel by a flow director or distributor 3. The flow director is basically a curved conduit and may be of any shape which directs the incoming mixed-phase stream along the outer wall of the vessel to thereby spread the liquid over this relatively large surface area and prevent the direct impingement of the incoming stream upon the internal structures contained within the outer vessel. This spreading of the liquid also promotes the release of entrained gas bubbles from the liquid. It furthermore serves to promote the separation of the liquid and vapor entrained in the inlet stream through the use of centrifugal force generated by the circular movement of the incoming stream.

The mixed-phase inlet stream is discharged into an upper annular volume 4 which is located between the inner surface of the outer vessel and the outer surface of an upper inner cylindrical wall 5. The upper annular volume 4 is sealed at the top by a ring-shaped horizontal plate 19 but is open on the bottom and communicates with a lower annular volume 23. No vapor outlet means is located on the lower annular volume, and therefore all vapor discharged into the upper annular volume must pass through perforations 6 in the upper inner cylindrical wall 5. These perforations are preferably located at a point below inlet distributor 3 and comprise a relatively large number of small diameter holes which allow the vapor to pass from the upper annular volume at a relatively low velocity. The vapors passing through perforations 6 enter an upper cylindrical volume 7 located within the upper cylindrical wall 5 and flow upward toward a vapor outlet conduit 20 which communicates with the upper portion of the internal volume of the vessel above the liquid-vapor contacting means.

This upward vapor flow is interrupted by at least two liquid-vapor contacting trays 15 and 17 on which is maintained a level of an externally produced hydrocarbon material which serves to capture liquid droplets entrained in the rising vapors. This externally produced liquid enters the outer vessel 1 through liquid inlet line 18 and is directed to the top of vapor-liquid contacting tray 17. The exact type of tray or baffle used as the liquid-vapor contacting means may vary and may include cross-flow, radial flow or reverse flow trays, cascade or split flow trays or a donut type configuration. The trays may be of a bubble cap variety or of a seive-type variety, commonly referred to as a perforated tray. It is also within the scope of my invention that the liquid-vapor contacting means will comprise a packed bed of high surface area material such as Raschig rings or Berl saddles.

The externally produced liquid charged to the upper tray 17 will overflow the tray and flow downward through downcomer 21 to tray 15 located below, across tray 15 and then downward through downcomer 22 to liquid retaining tray 16. Although not shown in the drawing, trays 15 and 17 may have a lip or weir surrounding the upper opening of the downcomer to maintain a selected liquid height upon the respective trays. In a like manner, liquid retaining tray 16 will have a weir at its outer edge to retain a sufficient amount of liquid on the tray to seal downcomer 22 and to thereby prevent the passage of vapors upward through the downcomer instead of through tray 15. The externally produced liquid material and any captured entrained liquid then falls from the retaining tray 16 downward through the upper cylindrical volume and into a lower cylindrical volume 11 and is removed from the vessel along with the liquid separated from the inlet stream.

The border line between the upper annular volume 4 and the lower annular volume 23 is marked on FIG. 1 by a horizontal ring-shaped plate 9. The lower annular volume is located between the inner surface of the outer vessel 1 and the outer surface of a lower cylindrical wall 10, and as previously mentioned, is preferably sealed from the lower cylindrical volume 11 and the upper cylindrical volume 7 so to prevent gas flow out of the lower annular volume. The lower annular volume is divided into four sections by vertical baffles 8 spaced at 90° angles from one another. These baffles function to reduce the amount of agitation and rotation which occur in the liquid phase material contained within the lower annular volume, and thereby facilitate the rise of gas bubbles to the upper surface 12 of the liquid maintained in the lower annular volume.

Because the lower inner cylindrical wall 10 has a smaller diameter than the upper cylindrical wall 5, the lower annulus has a larger volume than in the upper annulus, which lengthens the liquid residence time. Conversely, the larger diameter of the upper cylindrical wall 5 results in a larger cross-sectional area in the upper cylindrical volume 7. Therefore, vapors rise through this volume at a low velocity and the separation of entrained liquid from the vapor by the action of gravity upon the entrained liquid is enhanced. The bottom portion of the internal volume of the vessel is further divided into eight wedge-shaped sections by eight vortex breakers 14 located at a 45° angle from each other in the hemispherical lower end of the vessel. The vortex breakers serve to further reduce the turbulence in the liquid in the proximity of the liquid outlet means 13.

Figure 2:
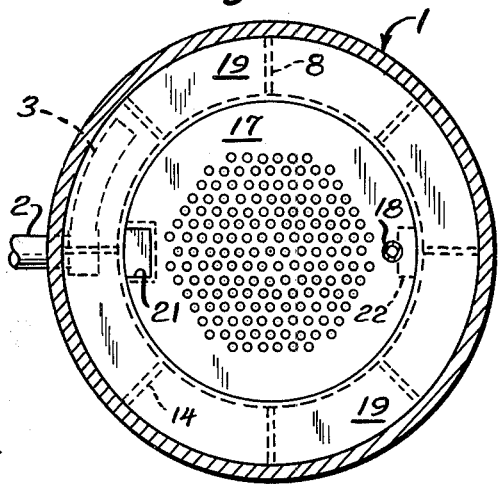
FIGS. 2, 3 and 4 are horizontal cross-sections taken along Lines 2—2, 3—3, and 4—4 of FIG. 1 respectively.

In FIG. 2, one is looking downward toward the top surface of the ring-shaped horizontal plate 19 and the upper liquid-vapor contacting tray 17. Inlet line 2 is shown passing through the outer vessel 1 and discharging into the flow director 3 represented as a horizontal conduit extending in a clockwise direction. The liquid inlet line 18 for the externally produced liquid is shown along with downcomer openings 21 and 22. In this view, the wedge-shape division of the lower internal volume is apparent. It is produced by the four baffles 8 and the eight vortex breakers 14 which produce a pie-shaped pattern on the drawings. Four of the vortex breakers are hidden from view by the four baffles directly above them. These vortex breakers may be shifted in position or changed in number if desired.

Figure 3:
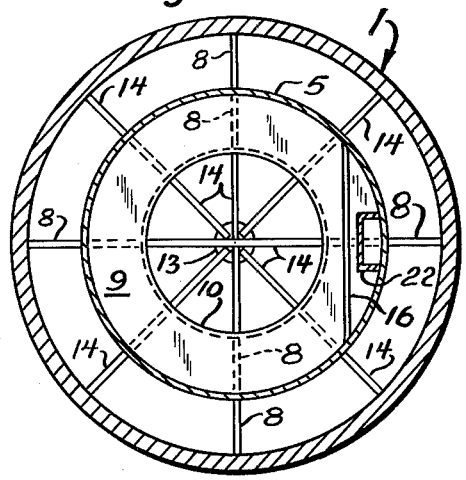

FIG. 3 is the view produced by sectioning the vessel horizontally at a point below the mixed-phase fluid inlet means and the vapor-liquid contacting trays. At this level, the outer vessel 1 is divided into the upper annular volume and the upper cylindrical volume by cylindrical wall 5. Ring-shaped horizontal plate 9 is also visible in this view, as is the liquid outlet means 13. Lower cylindrical wall 10 is shown at the inner edge of plate 9. The four right-angled baffles 8 are also visible in that portion of the drawing not covered by the ring-shaped plate 9. In a like manner, the eight vortex breakers numbered 14 are partially visible, with parts of four of them hidden below baffles 8. The location of the liquid retaining tray 16 and the downcomer 22 is also indicated.

Figure 4:
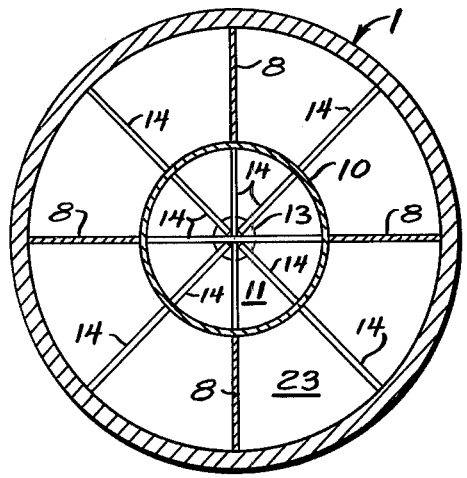

FIG. 4 presents the view looking downward from a point below ring-shaped plate 9. At this point, no horizontal structural elements are present and all numbered elements therefore represent vertical conduits or plates. The internal volume of the outer vessel 1 is at this point divided into the lower annular volume 23 and the lower cylindrical volume 11 by the lower cylindrical wall 10. Again, the four right-angled baffles 8 are shown along with the eight vortex breakers numbered 14. The eight vortex breakers extend to the center of the vessel while the four vertical baffles do not and end at the lower cylindrical wall 10. The vortex breakers therefore preferably extend across the opening of the liquid outlet means 13.

The representation of the preferred embodiment of my invention presented in this series of drawings is not intended to limit the invention to precisely that form shown. Those minor physical modifications of this apparatus which might readily be made by those skilled in the art, such as the movement of the baffles, vortex breakers, downcomers, or a different tray construction or placement of the inlet and outlet lines is considered within the scope of my invention. For the purposes of simplicity and clarity, commonly used accessories such as liquid level sensing and control systems have not been shown on this diagram.

DETAILED DESCRIPTION OF THE INVENTION

In many hydrocarbon conversion processes, a mixed-phase fluid stream is charged into a vessel designed to separate this stream into relatively pure streams of vapor and liquid. These vessels are designed with two separate considerations in mind. First, there is the problem of entrainment of liquid into the vapor stream, and second, there is the problem of the entrainment of gas bubbles into the liquid stream. It is an object of my invention to provide an apparatus which effectively separates a mixed-phase stream and limits both liquid and gas entrainment in the respective effluent streams. It is a further object of my invention to provide an apparatus which may be used in conjunction with the separation process described in U.S. Pat. No. 3,546,099 in which the effluent vapor stream is subjected to a liquid contacting operation in which the vapor stream is in effect scrubbed with an independently produced liquid stream charged to the separation vessel.

My apparatus is useful in the processing of petroleum fractions. It will also find utility in other applications, such as the breakdown of foam produced when an aqueous caustic solution enters a separation vessel during the catalyst regeneration step normally performed between operating periods of a hydrocarbon conversion process. These applications imply the use of high pressures and therefore a metallic vessel, but my apparatus may also be used in the separation of low pressure streams found in petrochemical facilities or pollution abatement plants. In these latter applications, the apparatus may be constructed of a different material such as reinforced plastic.

One of the possible modifications of the specific embodiment depicted in the drawing is the use of only one cylindrical wall within the outer vessel to thereby create only one annular volume instead of the two volumes shown. The upper annular cylindrical wall 5 and the lower annular cylindrical wall 10 would therefore be indistinguishable. They would merge into a single wall rising from the lower portion of the outer vessel to the upper portion of the inner volume of the outer vessel, which upper portion is defined as that part of the inner volume located above the perforations 6 in the inner cylindrical wall. The location of various parts of the apparatus can best be defined in relation to the perforations because they are necessary and also because they naturally divide the vessel into portions which have different functions.

The construction shown in the drawing is the preferred embodiment because it provides several advantages. One of these advantages is that the cross-sectional area of the upper internal cylindrical volume 7 is larger, and therefore the upward velocity of the vapor stream through the internal cylindrical volume is lower, and entrained liquid is more likely to settle downward. This also produces a lower vapor velocity through the vapor-liquid contacting means 15 and 17 which reduces the tendency of the vapor to froth or foam on the liquid contacting trays. The differential in the cross-sectional area of the internal cylindrical volumes therefore decreases the entrainment of liquid into the effluent vapor stream.

A second advantage is present in the bottom portion of the internal volume of the vessel, which bottom portion is defined as that section of the vessel located below the perforations in the inner cylindrical wall, and more specifically is the lowermost portion of the vessel, wherein a sizable amount of liquid material is held. The bottom portion of the internal volume of the vessel extends downward to the liquid outlet means with which it communicates and includes the lowermost sections of both the cylindrical and annular lower volumes. The large amount of liquid normally retained in this location is indicated by a liquid level 12 shown approximately one-half of the way up the baffles 8. The larger annular volume in the bottom portion of the vessel results in the downward velocity component of the liquid retained within the annulus being quite small because of the longer residence time. This combination of reduced downward drag forces and a longer residence time allows more entrained gas bubbles to rise to the surface of the liquid phase and eventually break down. By lower portion of the annulus is meant that section which is normally located below liquid level 12, and which includes at least the lower one-third of lower annular volume 23.

The purpose of the baffles 8 and the vortex breakers 14 is to prevent agitation of the liquid maintained in this bottom portion of the vessel by descending liquid or by the flow of liquid through the outlet means 13. It is preferred that the baffles 8 are four vertical rectangular partitions set at 90° angles from each other. The vortex breakers are preferably four semi-hemispherical plates which intersect one another above the outlet means 13 to form a sectioned volume similar in appearance to a halved grapefruit. Although not shown in the drawing, a number of holes may be distributed through the baffles and vortex breakers to allow the distribution of liquid between the various sections of the lower volume of the vessel. The entire liquid flow will not descend uniformly distributed of its own accord, and the downward flows through individual sections could therefore be excessive if not distributed in this manner.

The annular volume has a vapor-tight seal at all points above the perforations 6 to prevent the flow of vapor out of the annular volume by any other route than by the perforations. This causes all vapor material to enter the inner cylindrical volume at a point below the liquid-vapor contacting means. The annular volume is preferably also sealed at all points below the perforations down to the liquid level 12, including the junction with the horizontal ring-shaped plate 9. The lower portion of the annular volume is in open communication with the bottom portion of the internal volume of the vessel to allow the separated liquid material to pass through the lower portions of the vessel to outlet means 13. This also allows the flow of liquid material into the bottom sections of the lower internal cylindrical volume 11, and therefore as shown in the drawing the liquid level 12 will extend across the internal volume of the vessel inside both the lower annular volume and the lower cylindrical volume. Since the main liquid flow is through the annulus the liquid within the cylindrical volume is relatively stagnant. This is advantageous as it increases the number of gas bubbles entrained in the liquid transversing the horizontal distance from the annular volume to the liquid outlet which can rise into the stagnant liquid and then ascend to liquid level 12. This design therefore promotes the removal of entrained gas bubbles.

Liquid material which settles out of the vapor present in the upper internal cylindrical volume descends through the lower cylindrical volume to liquid level 12. The externally produced liquid material which enters the apparatus through line 18 to contact the vapor material also flows downward through the cylindrical volumes. This externally produced liquid material first flows over the liquid-vapor contacting means and then downward into the internal cylindrical volume and out of the vessel through outlet means 13.

The mixed-phase inlet means preferably discharges the mixed-phase stream into the annular volume at some point in the upper portion of the annular volume and substantially tangentially to the inner surface of the vessel. For this purpose, a flow director or distributor is located within the annular volume and connected to the fluid inlet line to impart a circular movement to the incoming fluids stream. This flow director may be a conduit of any shape, which induces a smooth impingement of the inlet stream upon the inner surface of the vessel. This spreads the liquid material over a greater surface area to promote the release of entrained gas material and the breakdown of foam. A smooth angular discharge also reduces the disbursement of liquid material into the vapor stream by preventing the direct impingement of the incoming fluid stream upon the inner wall of the annular volume. The location of inlet means above the perforations in the cylindrical wall requires an initial downward flow of the incoming vapors. The vapors must then turn and travel horizontally through the perforations, and this turning produces a cyclone-like separation of entrained liquid droplets. To enhance this separation, the annular volume and the perforations may be sized to present a greater downward vapor velocity above the perforations than the horizontal velocity through the perforations. This separation is also enhanced by the natural gravitational acceleration of the droplets.

The externally produced liquid material, also referred to as the second liquid material, which is fed to the liquid-vapor contacting means 15 and 17 through line 18 will normally be a different material than that which is withdrawn from the vessel through outlet 13. In applications such as that disclosed in the previously mentioned U.S. Pat. No. 3,546,099, the second liquid material will be a relatively light hydrocarbon as compared to the liquid material collected in the annular volume. The reason for contacting the effluent vapor with a lighter hydrocarbon stream is to prevent the carry-over of $C_7$-insoluble material usually referred to as asphaltenes into downstream sections of the process. These asphaltenes tend to form an emulsion upon contact with water in the downstream separation stages which is very hard to breakdown. A second reason for the removal of these asphaltenes is that the relatively light hydrocarbon material formed by the condensation of the vapor material withdrawn from the separation vessel is often further hydrotreated, and the presence of asphaltenes in this lighter material produces a substantial detrimental effect on the catalyst used in these following hydroprocessing steps. The opposite situation would be presented if the liquid material produced in the vessel was of a relatively light nature, and the second liquid material would then be used as a relatively lean heavy oil to adsorb substantial portions of entrained light material from the vapor stream.

A vapor outlet means communicates with the internal volume of the vessel above the vapor-liquid contacting means to allow the separated vapor to leave the vessel. This outlet means will normally pass through the wall of the outer vessel at the upper end of the vessel as shown in the drawing. A final demisting or coalescing screen may be installed in this location. Placing this demisting means across the entire cross-sectional area will produce a lower gas velocity and better separation, and therefore the relatively large internal volume above the vapor-liquid contacting means can be quite useful.

As an example of the preferred embodiment illustrated in the drawing, the approximate measurements of a commerical separation apparatus designed for use on a hydrocracking unit being charged 45,000 Bbl./day of a 15.4 °API oil are given below. This separator vessel was designed to operate at conditions which would result in the production of 538,680 lbs./hour of vapor having a density of 1.38 lbs./cubic foot and 809,600 lbs./hour of liquid having a specific gravity of 0.56, of which about 300,000 lbs./hour is recycled liquid. This design provides about 7 minutes of liquid residence time when 10 feet of liquid is maintained within the vessel. The vessel is 15 feet in diameter and approximately 40 feet in height. The upper inner cylindrical volume has a diameter of about 11 feet and the lower inner cylindrical volume has a diameter of about 6 feet, and the upper annular volume therefore has a distance of about 2 feet between the inner and outer walls and the lower annular volume has a distance of about 4.5 feet between its inner and outer walls. The upper annular volume is 12 feet high and the lower annular volume is 10 feet high. The perforations in the upper cylindrical wall start at a distance of about 8 feet below the top of the upper annular volume and comprise several rows of 1¼-inch diameter holes spaced 3 inches apart horizontally from center line to center line. An optional modification is the placement of a woven wire mesh around these holes to serve as a coalescing and demisting device. The inlet distributor is located approximately 4 feet below the top of the upper annular volume and ends in a square conduit about 12 inches wide and 2½ feet high which is made to fit the contour of the inner wall of the vessel to impart a circular motion to the incoming mixed-phase material. The baffles are placed at 90° angles from one another as illustrated in the drawing, and the vortex breakers are placed at 45° angles from one another as is also illustrated in the drawing. A number of 2-inch diameter holes are located in the baffles and vortex breakers to allow distribution of liquid evenly around the lower portion of the internal volume of the vessel.

I claim as my invention:

1. A vapor-liquid separation apparatus which comprises:
   a. a vertically orientated cylindrical outer vessel;
   b. a cylindrical wall axially aligned within the vessel and forming an annular volume located between the inner surface of the outer vessel and the outer surface of the upper cylindrical wall, and also forming a cylindrical volume located within the cylindrical wall, said annular volume having an upper seal which prevents fluid flow, said cylindrical wall having a plurality of perforations located a vertical distance below a hereinafter described mixed-phase fluid inlet means, which perforations allow the passage of fluids from the annular volume into the cylindrical volume;

c. a mixed-phase fluid inlet means passing into the vessel and discharging an entering fluid mixture into the annular volume in a substantially tangential direction relative to the inner surface of the outer vessel;

d. a liquid outlet means passing through a wall of the vessel and communicating with a bottom portion of the internal volume of the vessel to effect the withdrawal of separated liquid material which entered the annular volume via the mixed-phase fluid inlet means and descended through said annular volume into the lower portion of the vessel;

e. a liquid-vapor contacting means located in said cylindrical volume at a point above said perforations in the cylindrical wall, said liquid-vapor contacting means extending across the cylindrical volume to effect the passage of vapor entering the cylindrical volume from the annular volume through the vapor-liquid contacting means;

f. a liquid inlet means passing through a wall of the vessel and extending to an upper portion of said liquid-vapor contacting means;

g. a vapor outlet means passing through a wall of the vessel and communicating with an upper portion of the internal volume of the vessel which is above said liquid-vapor contacting means to effect the withdrawal of a vapor from the vessel, said vapor having passed into the vessel and into the annular volume via said mixed-phase fluid inlet means and then into the cylindrical volume through the perforations in said cylindrical wall before having passed upward through the liquid-vapor contacting means, whereby a mixed-phase stream is divided into a liquid fraction which descends through the annular volume and a vapor fraction which separates from the liquid and passes through perforations in the cylindrical wall before traveling upward through the liquid-vapor contacting means wherein liquid material entrained in the vapor is removed by contacting the vapor with an externally produced liquid material.

2. The apparatus of claim 1 wherein said liquid-vapor contacting means comprises at least two liquid-vapor contacting trays.

3. A vapor-liquid separation apparatus which comprises:

a. a vertically orientated cylindrical outer vessel;

b. an upper cylindrical wall axially aligned within the vessel and forming an upper annular volume located between the inner surface of the outer vessel and the outer surface of the upper cylindrical wall, and also forming an upper cylindrical volume located within the upper cylindrical wall, said annular volume having an upper seal which prevents fluid flow and communicating with a hereinafter described lower annular volume, said upper cylindrical wall having a plurality of perforations located a vertical distance below a hereinafter described mixed-phase fluid inlet means, which perforations allow the passage of fluids from the upper annular volume into the upper cylindrical volume;

c. a mixed-phase fliud inlet means passing into the vessel and discharging an entering fluid mixture into the upper annular volume in a substantially tangential direction relative to the inner surface of the outer vessel;

d. a lower cylindrical wall axially aligned within the vessel and forming a lower annular volume between the inner surface of the outer vessel and the outer surface of the lower cylindrical wall and also forming a lower cylindrical volume located within the lower cylindrical wall, the lower cylindrical wall having a smaller diameter than the upper cylindrical wall and being located below the upper cylindrical wall, with the interface between the bottom of the upper cylindrical wall and the top of the lower cylindrical wall being sealed to prevent fluid flow, and with a lower portion of the lower annular volume in communication with a bottom portion of the internal volume of the outer vessel;

e. a liquid outlet means passing through a wall of the vessel and communicating with said bottom portion of the internal volume of the vessel to effect the withdrawal of separated liquid material which entered the upper annular volume via the mixed-phase fluid inlet means and descended through said upper annular volume into the lower annular volume and then into the lower portion of the vessel;

f. a liquid-vapor contacting means located in said upper cylindrical volume at a point above said perforations in the upper cylindrical wall, said liquid-vapor contacting means extending across the upper cylindrical volume to effect the passage of vapor entering the cylindrical volume from the upper annular volume through the liquid-vapor contacting means;

g. a liquid inlet conduit means passing through a wall of the vessel and extending to an upper portion of said liquid-vapor contacting means;

h. a vapor outlet means passing through a wall of the vessel and communicating with an upper portion of the internal volume of the vessel which is above said liquid-vapor contacting means to effect the withdrawal of a vapor from the vessel, said vapor having passed into the vessel and into the upper annular volume via said mixed-phase fluid inlet means and then into the upper cylindrical volume through the perforations in said upper cylindrical wall before having passed upward through the liquid-vapor contacting means, whereby a mixed-phase stream is divided into a liquid fraction which descends through the annular volumes and a vapor fraction which separates from the liquid and passes through the perforations in the cylindrical wall before traveling upward through the liquid-vapor contacting means wherein liquid material entrained in the vapor is removed by contacting the vapor with an externally produced liquid material.

4. The apparatus of claim 3 wherein said liquid-vapor contacting means comprises at least two liquid vapor contacting trays.

* * * * *

UNITED STATES PATENT AND TRADEMARK OFFICE
CERTIFICATE OF CORRECTION

PATENT NO. : 3,900,300
DATED : Aug. 19, 1975
INVENTOR(S) : BRUCE LEHMAN

It is certified that error appears in the above–identified patent and that said Letters Patent are hereby corrected as shown below:

The correct filing date is Oct. 19, 1973.

Signed and Sealed this twenty-fifth Day of November 1975

[SEAL]

Attest:

RUTH C. MASON
*Attesting Officer*

C. MARSHALL DANN
*Commissioner of Patents and Trademarks*